United States Patent [19]

Wells

[11] Patent Number: 5,042,299

[45] Date of Patent: Aug. 27, 1991

[54] CAPACITIVE FLUID LEVEL SENSOR

[75] Inventor: Paul Wells, Newberg, Oreg.

[73] Assignee: IIMorrow, Inc., Portland, Oreg.

[21] Appl. No.: 560,870

[22] Filed: Jul. 23, 1990

[51] Int. Cl.$^5$ .............................................. G01F 23/26
[52] U.S. Cl. ................................. 73/304 C; 340/620; 324/663; 324/678
[58] Field of Search ...................... 73/304 C; 340/620; 324/663, 671, 678, 61 P

[56] References Cited

U.S. PATENT DOCUMENTS

| | | | |
|---|---|---|---|
| Re. 27,829 | 12/1973 | Tiffany | 324/678 |
| 2,530,619 | 11/1950 | Kliever | 73/304 C |
| 2,918,818 | 12/1959 | Meyer | 73/304 C |
| 3,254,333 | 5/1966 | Baumoel | 73/304 C |
| 3,301,056 | 1/1967 | Blanchard | 73/304 C |
| 3,534,606 | 10/1970 | Stamler et al. | 73/304 C |
| 3,553,575 | 1/1971 | Shea | 73/304 C |
| 4,001,676 | 1/1977 | Hile et al. | 324/678 |
| 4,054,833 | 10/1977 | Briefer | 324/678 |
| 4,204,427 | 5/1980 | Gothe et al. | 73/304 C |
| 4,235,106 | 11/1980 | Maltby et al. | 73/304 C |
| 4,262,531 | 4/1981 | Hewitt et al. | 73/304 C |
| 4,296,630 | 10/1981 | Jung et al. | 73/304 C |
| 4,347,740 | 9/1982 | Townsend | 73/304 C |
| 4,350,040 | 9/1982 | Fasching et al. | 73/304 C |
| 4,388,828 | 6/1983 | Dougherty | 73/304 C |
| 4,418,569 | 12/1983 | Kuhnel | 73/304 C |
| 4,437,060 | 3/1984 | Ferenczi et al. | 324/678 |
| 4,444,051 | 4/1984 | Yamaki et al. | 73/304 C |
| 4,449,405 | 5/1984 | Franz et al. | 73/304 C |
| 4,459,541 | 7/1984 | Fielden et al. | 324/678 |
| 4,467,646 | 8/1984 | Berryman et al. | 73/304 C |
| 4,497,204 | 2/1985 | Kobayashi | 73/304 C |
| 4,594,893 | 6/1986 | Lombard et al. | 73/304 C |
| 4,636,714 | 1/1987 | Allen | 324/678 |
| 4,661,768 | 4/1987 | Capusillo | 324/678 |
| 4,706,032 | 11/1987 | Allen et al. | 73/304 C |
| 4,775,830 | 10/1988 | Lyyra | 324/678 |
| 4,806,847 | 2/1989 | Atherton et al. | 340/620 |
| 4,875,497 | 10/1989 | Worthington | 73/304 C |
| 4,950,998 | 8/1990 | Kramer et al. | 73/304 C |

FOREIGN PATENT DOCUMENTS

| | | |
|---|---|---|
| 2254808 | 6/1974 | German Democratic Rep. ... 73/304 C |
| 2025623 | 10/1980 | United Kingdom ............. 73/304 C |

OTHER PUBLICATIONS

Wohschall, Circuit Design for Electronic Instrumentation, 2nd edition, pp. 104–107 and 134–136 (no date).
Endress & Hauser, Inc., "LTC 1210—Two-Wire Capacitance Level Transmitter" and Capacitance Probes for Level Control and Measurement, Greenwood, Ind. (no date).
Sabbetti et al., "Automotive Pressue Transducer for Underhood Applications", Sensors and Actuators, SAE International Congress and Exposition, Detroit, Mich., Feb. 29, 1988, pp. 53–59.
Garwood, "Noncontact Presence Sensing: What Works Where and Why", Sensors, Aug. 1988, pp. 19–21.

Primary Examiner—Allan N. Shoap
Assistant Examiner—Diego F. F. Gutierrez
Attorney, Agent, or Firm—William A. Birdwell

[57] ABSTRACT

A linear compensated capacitive fluid-level sensing device includes three capacitors. A measurement capacitor is positionable during use to receive a fluid. A compensation capacitor is submerged in the fluid so that the fluid fills the space between the electrodes. An offset capacitor has a capacitance equivalent to the capacitance of the measurement capacitor when only air exists between the measurement electrodes. Charge applied to each of the three capacitors is discharged to an associated differential amplifier through a respective switch when the capacitors are disconnected from a charging voltage supply. The offset amplifier generates an inverted output current that is applied to the discharge currents of the measurement and compensation amplifiers. The compensation amplifier output gates a frequency-controlled oscillator that in turn controls the switches.

9 Claims, 2 Drawing Sheets

CAPACITIVE FLUID LEVEL SENSOR

BACKGROUND OF THE INVENTION

This invention relates to capacitive sensors for sensing the presence of material, and particularly to a capacitive fluid level sensor having switched capacitors and modular circuitry.

As discussed by Garwood in "Noncontact Presence Sensing: What Works Where and Why", *Sensors*, August 1988, pages 19-21, capacitive sensors are often preferred for fill level sensing and nonmetallic object sensing. Capacitors have the particular advantage of being directly immersible into solids and liquids. They are, however, subject to changes in dielectric constant. The very advantage that creates their unique applicability also reduces their accuracy due to changes in temperature and humidity, or material makeup.

In order to compensate for these environmental and subject material changes, capacitive circuits have been constructed to sense the material independent of dielectric changes in the material and environment. For instance, in U.S. Pat. No. 4,418,567, Kuhnel discloses a capacitive sensor containing a reference "full" capacitor fully submersed in a fluid to be measured, for compensating for changes in the dielectric of the fluid. Another "empty" capacitor, always excluded from the fluid, compensates for the dielectric effect of air. A level-sensing or "measurement" capacitor is partially submerged to sense the fill level of the fluid as represented by the combined dielectric effect of fluid and air between the capacitor electrodes.

Kuhnel applies an amplitude-controlled alternating voltage to each of the capacitors. The resulting signal from the capacitors is multiplied by a 90° phase-shifted alternating voltage signal to produce a voltage level representative of the capacitance of each of the capacitors. The measurement capacitance voltage and full capacitance voltage are each applied to the noninverting inputs of respective differential amplifiers. The empty capacitance voltage is input to the inverting inputs of both of these differential amplifiers.

The output of the amplifier with the measurement capacitance voltage input is an output voltage proportional to the level of filling. The output of the other amplifier is input into the inverting input of a third differential amplifier for feedback to yet another amplifier controlling the amplitude of the alternating voltage applied to the three capacitors.

This design is simplified somewhat in a circuit disclosed by Berryman et al. in U.S. Pat. No. 4,467,646. In addition to a disclosure of specific electrode structure, Berryman et al. describe a circuit in which "full" compensation and measurement capacitors are connected directly to inverting inputs of corresponding amplifiers as well as to amplifier-feedback circuits connected to the amplifier outputs.

The noninverting inputs of the amplifiers and an empty-position compensation circuit receive an amplitude-controlled oscillator output. The full and measurement amplifier and the empty-position compensation circuit outputs are treated the same as the voltage level outputs in the circuit disclosed by Kuhnel.

These circuits are generally effective for providing filling level sensing. However, they still require multiple stages of capacitor signal amplification and manipulation. Further, the capacitor charging is provided by varying the applied voltage.

SUMMARY OF THE INVENTION

The present invention provides a capacitive level-sensing circuit that is even further simplified. Simplification in the invention exists in the use of only one amplifier stage for each measurement or compensation capacitor. This circuit is inexpensive to construct, can be constructed using integrated circuit technology, and provides matched modular construction.

In another aspect of the invention, a feedback oscillator is frequency-controlled and the capacitors are switched between a voltage source and the capacitance-sensing circuits. Compensation is thus achieved by varying the frequency of capacitor charging and discharging, rather than by varying the voltage level, as provided by the prior art.

The preferred embodiment of the invention includes a measurement capacitor having a pair of electrodes positionable during use to receive a fluid. The capacitance of the measurement capacitor is determined by the level of fluid between the measurement electrodes. A compensation capacitor is submergible in the fluid so that the fluid fills the space between the compensation capacitor electrodes during use. An offset capacitor has a capacitance equivalent to the capacitance of the measurement capacitor when only air exists between the measurement electrodes.

Switches, responsive to a switch control signal, selectively connect each of the three capacitors to, and disconnect them from a voltage supply for charging and discharging them. The capacitors are discharged through associated transimpedance amplifier circuits when they are disconnected from the voltage supply.

The offset amplifier is constructed as a current mirror for generating an output current representative of the offset capacitor discharge current. The offset output current is inverted by the amplifier and applied to the discharge currents of the measurement and compensation capacitors.

The compensation amplifier generates a compensation signal representative of the discharge current from the compensation capacitor adjusted by the offset current. The compensation signal has a high state when the compensation capacitor is connected to the compensation amplifier and a low state when the compensation capacitor is connected to the voltage supply.

A frequency-controlled oscillator, gated and controlled by the compensation signal has an output connected to the switches for cyclically switching each of the capacitors between the voltage supply and the respective amplifier. The oscillator also includes a differential amplifier having its output connected to both the compensation amplifier output and to the switches. The oscillator is responsive to the compensation amplifier output signal for controlling oscillation frequency and for holding the switches in a position for discharging the capacitors. Thus, in effect, the control signal is gated by the compensation signal.

It will be appreciated that a circuit is provided that consists of only four differential amplifiers, associated components, and switches for the three capacitors. Thence, except for the capacitors, this circuit may be inexpensively constructed using integrated circuit technology. Further, the circuit compensates for the range of dielectric values existing in the matter between the measurement electrodes.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Referring to the figure, a device 10 for capacitively measuring the level of a fluid is shown. As mentioned previously, this same device, with proper construction and positioning of the capacitors and sizing of components, can be used to sense the presence of an object passing between the measurement electrodes, or other related uses.

Figure 1:
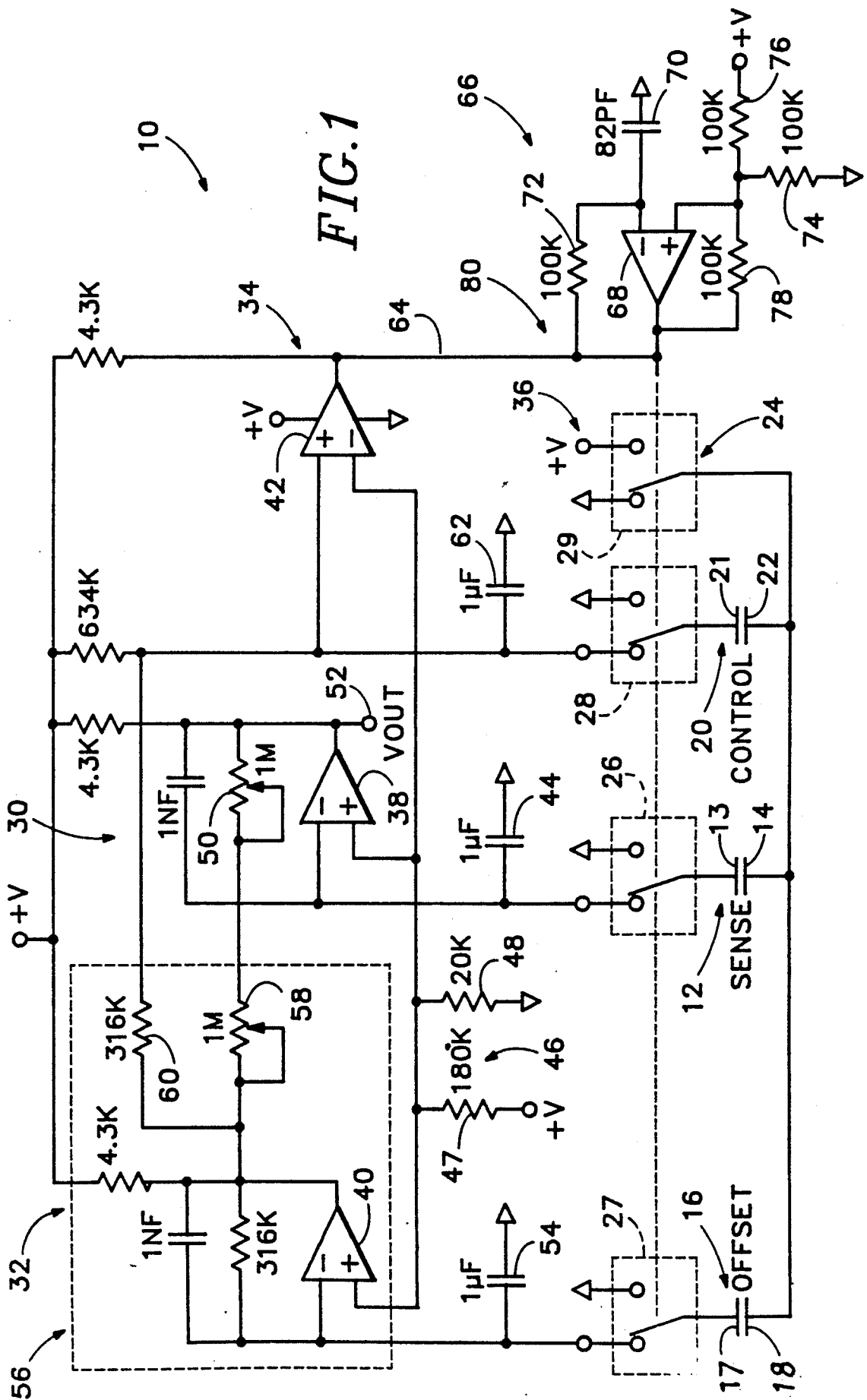
FIG. 1 is a circuit schematic of a capacitive material sensing apparatus according to the invention.
Figure 2:
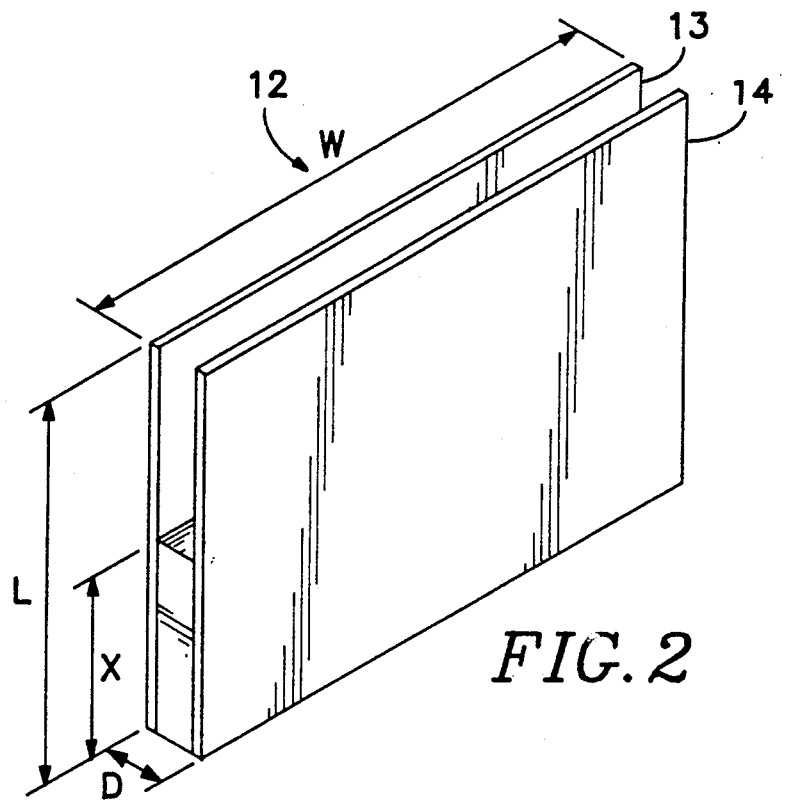
FIG. 2 is a perspective of a basic plate capacitor usable with the circuit of FIG. 1.
Figure 3:
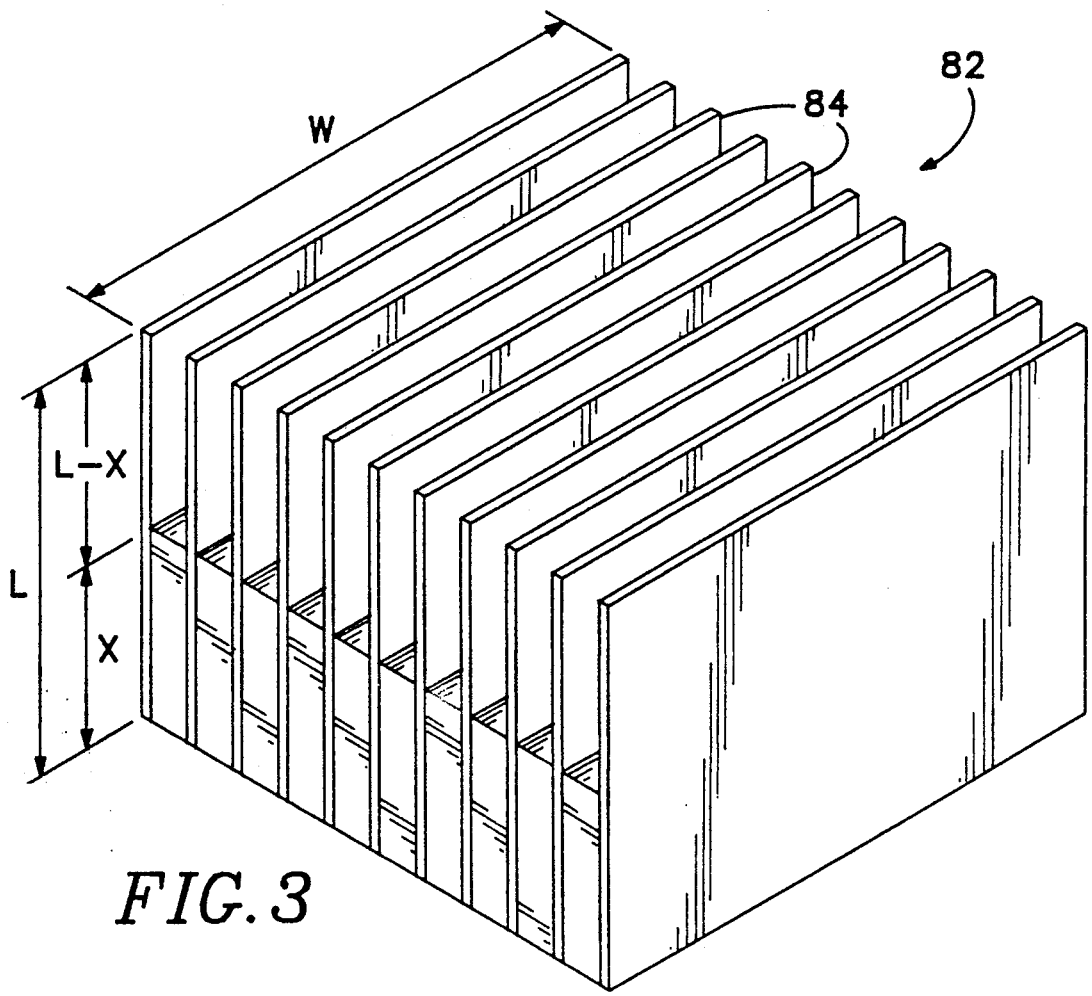
FIG. 3 is a perspective of a multiple-plate capacitor similar to the capacitor of FIG. 2.

Device 10 includes a sense capacitor 12 having electrodes 13 and 14. As described in the prior art, electrode configurations are well known, and often for convenience are in the form of concentric spaced tubes. Alternatively and more simply, the electrodes may be spaced-apart parallel plates, as shown in FIGS. 2 and 3. These plates are placed in a container having fluid the level of which is to be measured. Thus capacitor 12 and electrodes 13 and 14 may also be referred to as a measurement capacitor and measurement electrodes.

The electrodes are placed in the fluid so that the fluid level rises in the electrodes from a minimum point, such as when the container is empty, to a maximum point, such as when the container is full. At the empty level, there is no fluid between the electrodes, only air. At the full level, the fluid completely fills the electrodes. Thus, the impedance of the capacitor depends upon the net dielectric constants of the combination of air and fluid.

Referring to FIG. 2, the plates of the capacitor are assumed to be separated by a distance D, to have a horizontal width W, and to have a vertical length L. The vertical fluid level X varies from 0 to L. The plate area A, is equal to WL. The capacitance C of this capacitor is equal to EA/D, where E is the dielectric constant. The net capacitance is $$C = E_o E_r W X/D + E_o W(L-X)/D. \qquad (1)$$

Rearranging terms, $$C = (WX(E_r - 1)/D + WL/D)E_o, \qquad (2)$$

where $E_o$ is the dielectric constant of air and $E_r$ is the dielectric constant of the material whose level is being measured relative to air. This is a linear equation of the form $y = mx + b$. $E_o W(E_r - 1)/D$ is the slope, and $WL/D$ is the offset. X, the level of the liquid, is the variable, and C, the capacitance is the output.

Device 10 provides a linear output that is representative of the fluid fill level and independent of the dielectric constant of the fluid. The offset is derived from an offset capacitor 16 having offset electrodes 17 and 18. Capacitor 16 may be a capacitor identical to capacitor 12 except that it is always in air.

Similarly, a control or compensation capacitor 20, constructed to be identical to capacitor 12 and having electrodes 21 and 22, is positioned to be submerged completely in the fluid for all fluid levels to be measured.

The offset and control capacitors thus provide minimum and maximum capacitance values for sense electrode 12. The circuitry to combine and use these capacitors is as follows.

The capacitors are connected to a set 24 of switches 26, 27, 28 and 29, such as CMOS switch model MC14551B made by Motorola. Switches 26, 27 and 28 connect electrodes 13, 17 and 21 alternately between ground reference and charge pump amplifier circuits 30, 32 and 34, respectively. Electrodes 14, 18 and 22 are correspondingly alternately connected between a positive voltage supply 36 and ground reference. The normal position of the switches is the connection shown, i.e., connecting the capacitors between ground and the respective amplifier circuits.

Each amplifier circuit 30, 32, and 34 includes a differential amplifier 38, 40 and 42, respectively, such as an amplifier having model number LM2901 made by National Semiconductor Corporation. Capacitor 12 is connected through switch 26, and in parallel with a bypass capacitor 44, to the inverting input of amplifier 38. The noninverting input of this amplifier as well as that of amplifier 40 is connected to a low reference voltage determined by a voltage divider 46 formed of resistors 47 and 48 in series between a reference voltage and ground. A feedback potentiometer 50 is used to tune the circuit. An output terminal 52 from amplifier 38 has an output voltage that is representative of the sensed fill level of fluid.

Similar to the sense amplifier circuit, the offset amplifier circuit includes a bypass capacitor 54 connected between switch 27 and the inverting input of amplifier 40. Amplifier 40 forms part of a current mirror 56 having parallel output resistors 58 and 60. These resistors convert the output of amplifier 40 into currents that are mirrors of the input discharge current generated by the discharge of capacitor 16 when it is connected to amplifier 40.

Resistor 58 is also connected to the inverting input of amplifier 38 for offsetting the discharge current produced by capacitor 12. Resistor 60 is connected to the noninverting input of control amplifier 42. This input is also connected to a bypass capacitor 62 and to capacitor switch 28. The offset output current thus adjusts the control-capacitor discharge current as it does the sense-capacitor discharge current. The inverting input is connected to the low reference voltage provided by voltage divider 46.

Control amplifier 42 outputs what may be referred to as a compensation signal on a conductor 64. This conductor also has applied to it the output of a free-running oscillator 66, also referred to as generating means, formed from a differential amplifier 68, as shown. The inverting input of amplifier 68 is connected to the junction between a grounded capacitor 70 and a feedback resistor 72, as shown.

The noninverting input is coupled to a voltage divider circuit formed of a resistor 74 connected to ground and a resistor 76 connected to the voltage supply. A feedback resistor 78 is connected to conductor 64. The bias applied to the noninverting input is thus a result of the voltage at the voltage supply and the voltage on conductor 64.

When control switch 28 disconnects capacitor 20 from amplifier 42, the output of the amplifier is low.

During this portion of the oscillator cycle, the compensation signal has minimal effect on the oscillator operation.

When capacitor 20 is connected to amplifier 42 and discharges, a high compensation signal is produced. The oscillator output is correspondingly increased. This tends to maintain the switches in the "discharge" position until the capacitor is discharged. The oscillator also outputs a signal having a frequency determined by the voltage applied by amplifier 42 on conductor 64 by changing the bias on the amplifier.

The result is that the set 24 of switches are both gated and controlled in switching frequency by the control or compensation signal on conductor 64.

The voltage supply, switches, and oscillator are also collectively referred to as first circuit means 80 for applying a charge to capacitors 12, 16 and 20.

During a first half of an oscillator cycle, each capacitor is switched to a voltage that is negative with reference to the associated amplifier, and charges. During the second half of the oscillator cycle, the capacitor is switched to a virtual ground node at the amplifier and discharges.

The amount of charge Q transferred by the capacitor during each oscillator cycle is given by $Q=CV$, where V is the change in voltage and C is the capacitance. The total amount of charge transferred per second, or current, is the charge per cycle, Q, times the number of cycles per second of the oscillator, F; or $I=QF=CVF$. Thus the oscillator and switched capacitor look like a current source that is proportional to the capacitance, frequency and voltage. This current is fed into a summing amplifier to produce an output voltage, $V_{out}=IR=CVFR$.

In the present embodiment, the capacitance of the sense capacitor varies with the amount of fluid existing between the electrodes. The charging voltage and resistance remain constant, and the frequency is varied to provide compensation for changes in the dielectric constant of the fluid and air.

When the fluid level on the sense electrodes drops below the bottom edges, the capacitance of the sense capacitor is equal to the capacitance of the offset capacitor. Thus, the offset current fully offsets the sense current, forcing the output of amplifier 38 to zero.

When the level of the liquid completely covers the sense electrodes, the sense and control discharge currents are equal. The feedback into the oscillator causes the full scale output of the sense amplifier to be at essentially the supply voltage level supplied to the control amplifier.

In the preferred embodiment, a capacitor 82 formed of eleven parallel electrode plates 84 is used, with each plate having a width of 12.5 mm and a height of 42 mm, as shown in FIG. 3. This provides a nominal plate capacitance of 11 pF. A similar offset capacitor would preferably be used. The control and offset amplifiers are adjusted for 0.5 and 4.5 volt outputs and tested with SAE 30 motor oil.

It will be understood that many different capacitor configurations could be used with this circuitry. Capacitors can be shaped to correspond to different container capacity gradients over the range of fluid levels.

The preferred embodiment provides a fluid level or material presence sensing circuit that consists of four amplifiers, four switches and associated components. Such a circuit is readily constructed using integrated circuit technology. Further, by providing a feedback circuit using a gated and frequency-controlled oscillator for switching the capacitors, the circuit is stable.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A dielectric-compensated device for sensing capacitively the quantity of a material present, comprising:
   (a) measurement capacitor means having a pair of measurement electrodes spaced apart and positionable to receive said material between said measurement electrodes during use, said measurement capacitor means having a capacitance determined by the quantity and dielectric constant of said material between said measurement electrodes;
   (b) a voltage supply;
   (c) measurement switch means responsive to a switch signal for cyclically coupling said measurement capacitor means to said voltage supply and decoupling said measurement capacitor means from said voltage supply, said measurement electrodes charging to a level representative of the capacitance of said measurement capacitor means when said measurement switch means couples said voltage supply to said measurement capacitor means;
   (d) measurement circuit means coupled to said measurement switch means for discharging said measurement capacitor means when said measurement switch means is decoupled from said voltage supply, the discharge of the measurement capacitor means being representative of the capacitance of said measurement capacitance means, said measurement circuit means further generating an output signal representative of the discharge of said measurement capacitance means, and therefore the quantity of said material between said measurement electrodes;
   (e) compensation capacitor means having a pair of compensation electrodes and a predetermined amount of said material constantly between said compensation electrodes during use, said compensation capacitor means having a capacitance determined by the amount and dielectric constant of said material between said compensation electrodes;
   (f) compensation switch means responsive to the switch signal for cyclically coupling said compensation capacitor means to said voltage supply and decoupling said compensation capacitor means from said voltage supply, said compensation electrodes charging to a level representative of the capacitance of said compensation capacitor means when said compensation switch means couples said voltage supply to said compensation capacitor means;
   (g) compensation circuit means coupled to said compensation switch means for discharging said compensation capacitor means when said compensation switch means is decoupled from said voltage supply, the discharge of the compensation capacitor means being representative of the capacitance of said compensation capacitor means, said compensation circuit means further generating a compensation signal representative of the discharge of said compensation capacitance means, whereby the compensation signal changes according to a change in the dielectric constant of said material; and (h) generating means responsive to the compensation signal for generating the switch signal with a frequency representative of the compensation signal, said frequency affecting said output signal representative of the quantity of said material present so as to compensate for changes in the dielectric constant of said material.

2. The device according to claim 1 wherein the compensation signal is in one state when said compensation capacitor means is coupled to said compensation circuit and in a second state when said compensation capacitor means is coupled to said voltage supply, and said generating means is further responsive to the compensation signal for changing the value of the switch signal appropriately for maintaining the discharging of said compensation capacitor means.

3. The device according to claim 2 wherein said generating means has an output port from which the switch signal is derived and to which said compensation signal is applied, so as to control the frequency of the switch signal.

4. The device according to claim 1 further comprising:

offset capacitor means having a capacitance equivalent to the capacitance of said measurement capacitor means when only air exists between said measurement electrodes;

offset switch means responsive to the switch signal for cyclically coupling said offset capacitor means to said voltage supply and decoupling said offset capacitor means from said voltage supply; and current mirror means having an input connected to said offset switch means for receiving a discharge current, equal to the product of applied charge and frequency, from said offset capacitor means, and an offset output connected to the input of each of said measurement and compensation circuit means, and said current mirror means generating, on said offset output, an output current representative of the discharge current from said offset capacitor means, said output current offsetting the discharge currents input to the respective measurement and compensation circuit means.

5. A dielectric-compensated device for sensing capacitively the quantity of a material present, comprising:

(a) measurement capacitor means having a pair of measurement electrodes spaced apart and positionable to receive said material between said measurement electrodes during use, said measurement capacitor means having a capacitance determined by the amount and dielectric constant of said material between said measurement electrodes;

(b) compensation capacitor means having a pair of compensation electrodes and a predetermined amount of said material constantly between said compensation electrodes during use, said compensation capacitor means having a capacitance determined by the amount and dielectric constant of said material between said compensation electrodes;

(c) first circuit means responsive to a compensation signal for periodically applying a charge to said measurement capacitor means and a charge to said compensation capacitor means simultaneously so that the product of applied charge and frequency is representative of the compensation signal;

(d) measurement amplifier means having an input for receiving a discharge current, equal to the product of the charge applied to said measurement capacitor means and the frequency at which said charge was applied, from said measurement capacitor means, said measurement amplifier means generating an output voltage representative of the discharge current from said measurement capacitor means and thereby representative of the amount of said material present; and (e) compensation amplifier means having an input for receiving a discharge current, equal to the product of the charge applied to said compensation capacitor means and the frequency at which said charge was applied, from said compensation capacitor means, said compensation amplifier means generating the compensation signal to be representative of the discharge current from said compensation capacitor means, wherein said compensation signal is applied to said first circuit means to control the frequency at which charge is applied to said measurement capacitor means and to said compensation capacitor means.

6. The device according to claim 5 further comprising:

offset capacitor means having a capacitance equivalent to the capacitance of said measurement capacitor means when only air exists between said measurement electrodes;

said first circuit means being coupled to said offset capacitor means for applying a charge to said offset capacitor means at said frequency so that the product of applied charge and frequency is representative of the compensation signal; and current mirror means having an input connected to said offset capacitor means for receiving a discharge current, equal to the product of applied charge and frequency, from said offset capacitor means, and an offset output connected to the input of each of said measurement and compensation amplifier means, and said current mirror means generating, on said offset output, an output current representative of the discharge current from said offset capacitor means, said output current offsetting the respective measurement and compensation input discharge currents.

7. The device according to claim 5 wherein said first circuit means further comprises:

a voltage supply;

switch means responsive to a switch signal for cyclically connecting each of said measurement and compensation capacitor means to said voltage supply and disconnecting each of said measurement and compensation capacitor means from said voltage supply, the respective measurement and compensation electrodes each charging to a level representative of the capacitance of the associated one of said measurement and compensation capacitor means when said switch means connects said voltage supply to each of said measurement and compensation capacitor means; and means responsive to the compensation signal for generating the control signal with a frequency representative of the compensation signal, and thereby the dielectric constant of said predetermined material.

8. The device according to claim 7 wherein the compensation signal is in one state when said compensation capacitor means is connected to said compensation amplifier means and in a second state when said compensation capacitor means is connected to said voltage supply, and said generating means is further responsive to the compensation signal for changing the value of the switch signal appropriately for maintaining the discharging of said compensation capacitor means.

9. A device for measuring capacitively the level of fluid in a container comprising:

(a) measurement capacitor means having a pair of measurement electrodes spaced apart and positionable to receive the fluid between said measurement electrodes during use such that the level of fluid between said measurement electrodes corresponds to the level of fluid in the container, said measurement capacitor means having a capacitance determined by the level of fluid between said measurement electrodes;

(b) compensation capacitor means having a pair of compensation electrodes submergible in the fluid so that the fluid fills the space between said compensation electrodes during use, said compensation capacitor means having a capacitance determined by the dielectric constant of the fluid filling the space between said compensation electrodes;

(c) offset capacitor means having a capacitance equivalent to the capacitance of said measurement capacitor means when only air exists between said measurement electrodes;

(d) a voltage supply;

(e) switch means responsive to a switch signal for selectively connecting each of said measurement, compensation and offset capacitor means to said voltage supply and disconnecting each of said measurement, compensation and offset capacitor means from said voltage supply, the respective measurement, compensation and offset electrodes each charging to a level representative of the capacitance of the associated one of said measurement, compensation and offset capacitor means when said switch means connects said voltage supply to each of said measurement, compensation and offset capacitor means;

(f) measurement differential amplifier means having an inverting input connected to said switch means for receiving a discharge current, equal to the product of applied charge and frequency, from said measurement capacitor means when said switch means disconnects said measurement capacitor means from said voltage supply, said measurement amplifier means generating an output voltage representative of the discharge current from said measurement capacitor means;

(g) compensation differential amplifier means having a noninverting input connected to said switch means for receiving a discharge current, equal to the product of applied charge and frequency, from said compensation capacitor means when said switch means disconnects said compensation capacitor means from said voltage supply, said compensation amplifier means generating the compensation signal representative of the discharge current from said compensation capacitor means, the compensation signal having a high voltage when said compensation capacitor means is connected to said compensation amplifier means and a low voltage when said compensation capacitor means is connected to said voltage supply;

(h) current mirror means having an offset output connected to said inverting input of said measurement amplifier means and to said noninverting input of said compensation amplifier means, said current mirror means comprising an offset differential amplifier means having an inverting input connected to said switch means for receiving a discharge current, equal to the product of applied charge and frequency, from said offset capacitor means when said switch means disconnects said offset capacitor means from said voltage supply, said current mirror means generating on said offset output of said current mirror means an output current representative of the discharge current from said offset capacitor means, said output current of said current mirror means offsetting the discharge currents received on both said inverting input of said measurement amplifier means and said noninverting input of said compensation amplifier means; and (i) oscillator means having an output connected to said switch means and connected to said compensation amplifier means for receiving the compensation signal, said oscillator means being responsive to the compensation signal for generating the switch signal on the oscillator means output with a frequency representative of the compensation signal for cyclically connecting each of said capacitor means alternately to said voltage supply and to the respective one of said measurement, compensation and offset amplifier means, said oscillator means including differential amplifier means having an output on which the compensation and switch signals are applied.

* * * * *